April 17, 1934.  H. D. BEACH  1,955,047
SPECTACLE LENS
Filed Dec. 3, 1931
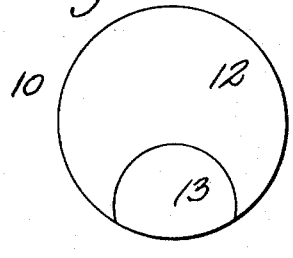
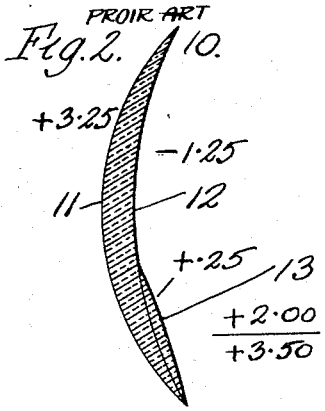
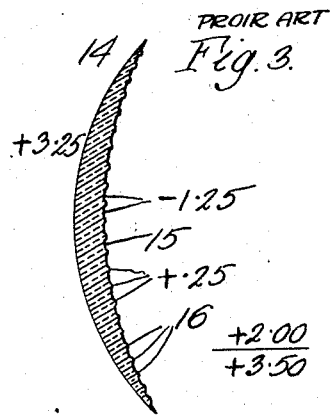
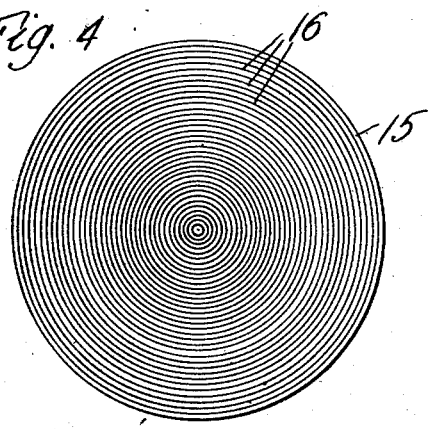
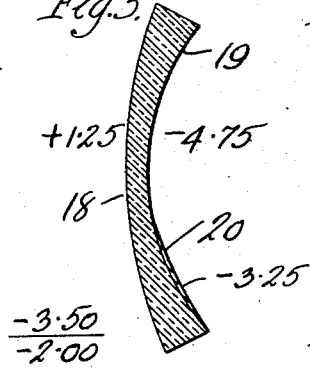
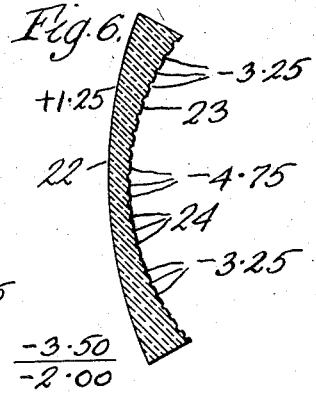
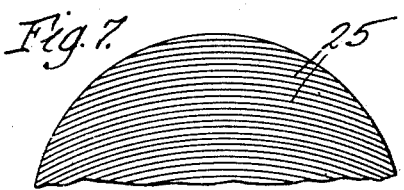
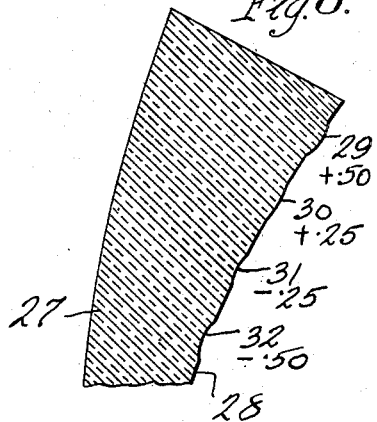
INVENTOR.
Howard D. Beach
by Parker & Prochnow
ATTORNEYS.

Patented Apr. 17, 1934

1,955,047

UNITED STATES PATENT OFFICE 1,955,047

SPECTACLE LENS

Howard D. Beach, Buffalo, N. Y.

Application December 3, 1931, Serial No. 578,677

10 Claims. (Cl. 88—54)

This invention relates to improvements in bifocal or multifocal spectacle lenses.

In lenses of this kind, as heretofore constructed, each of the different formulas called for in the lens is represented by or formed as a single area or portion of the lens. For example, in a bifocal lens the near vision field or area having a formula suitable for reading and the like is usually formed by a portion of say, one quarter to more of the total area of the lens and may be in the form of a separate or integral wafer, or section located in the lower half of the lens. The remaining area of the lens is formed in accordance with the other formula, as required for giving clear distance vision. The same general characteristics are present in multifocal spectacle lenses, each of the several fields or portions of different formula being distributed as a single defined area or unit on the lens.

The disks or sections for near vision are usually cemented or fused to a blank which has first been ground to the required distance formula. It is well known that spectacles so formed cause more or less discomfort or inconvenience to the wearer, since those portions of a lens adjacent the juncture of the areas of different formulas give a blurred effect, which causes imperfect vision and harmful strain upon the eye, when the gaze is directed through such portions.

The objects of the invention are to construct multi-focal spectacle lenses in which the above mentioned defects and limitations are eliminated, and by which great comfort is experienced in use, and strain upon the eyes avoided; also to construct a lens of this type which is formed without the use of a single defined area for each of the different formulas or types of vision required, but with which both near and far vision may be had through any portion thereof; also to construct a multifocal lens in which the portions of one formula, such as for near vision, are formed directly on a surface of the distance vision blank without the use of separate disks or sections; and also to construct a lens provided with such surface formations which can be polished and will produce a lens of substantially smooth, clear finish and in which said surface formations will not interfere with the comfort or vision of the wearer, nor mar the appearance and style of the spectacles.

Other objects are to provide a spectacle lens by the use of which clear vision, without discomfort may be had through all portions thereof when looking at objects at different distances; and also to construct such a lens, which will be of practically universal focus, and with which the last mentioned object may be realized without the necessity of directing the gaze through different, or separate, prescribed areas of the lens.

In the drawing:

Fig. 1 is a face view of a bifocal spectacle lens of well known form;

Fig. 2 is a vertical section of such a lens, constructed in accordance with a given prescription;

Fig. 3 is a similar view of a bifocal spectacle lens, constructed in accordance with an embodiment of my invention, and using the same prescription as that in the lens of Fig. 2;

Fig. 4 is a face view of the lens shown in Fig. 3;

Fig. 5 is a vertical section of another known form of bifocal lens, illustrating a given prescription;

Fig. 6 is a similar view of a lens constructed in accordance with my invention, and using the same prescription as that of Fig. 5;

Fig. 7 is a similar view, illustrating a modification thereof;

Fig. 8 is a fragmentary section, on a greatly enlarged scale, of a portion of a lens of a further modified form, having the characteristics of a universal focus lens.

In general, my invention provides a bifocal or multifocal spectacle lens in which one or more of the formulas of the prescription for the lens is, or are, distributed in the form of relatively minute areas or portions over an entire face of the lens, and intermixed with the other formula, or formulas, as distinguished from types of bifocal or multiflocal spectacle lenses heretofore known in which the separate formulas or portions of the lens have been confined to relatively large separate areas or sections, as illustrated in Figs. 1, 2 and 5, and which have necessitated the shifting of the gaze from one part of the lens to another when looking at objects near to or at some distance from the observer.

By way of example, there is shown in Fig. 2, a section of a bifocal lens constructed in accordance with the following prescription written in standard diopters or units, viz:

$$\frac{\text{distance} + 2.00}{\text{reading } +3.50}.$$

To effect this, the lens 10 will be formed with an outer curved face 11 of a formula of +3.25 and an inner curved face 12 of a formula of —1.25. The entire lens is first ground and polished in accordance with the foregoing to provide the distance formula, after which a small polished section or disk 13 is cemented, fused or otherwise secured to or formed on the lower portion of its inner face to provide an area for near vision or reading, and the back face of which will be of the formula +.25, which, added to the formula +3.25 of the front face 11, will provide the required formula of +3.50 for reading, in accordance with the prescription.

In Fig. 3, which illustrates a spectacle lens 14 of the same formula as before, but constructed in accordance with my invention, the lens is first ground so that its outer face corresponds to the formula +3.25 and with its inner face 15 corresponding to the formula —1.25, as before. I now form upon this inner face 15, see also Fig. 4, a multiplicity of extremely fine annular ridges, lines or separated portions or areas 16, the contour or cross sectional shape of which corresponds to the formula +.25, and which replaces the separate disk or section 13 of Figs. 1 and 2. These minute ridges or areas 16 are, in the arrangement shown, disposed in regular spaced relation concentrically about the optical center of the lens. This, however, is not essential since these ridges or faces may be disposed otherwise. They may also be arranged closer together near the center and farther apart near the edges of the lens, or vice versa, as may be found most suitable. Also the relative proportions of the total area occupied by the ridges or areas 16 to that of the distance portions of the face 15 may be varied as found most desirable. For example, when the spectacles are to be used by a person who does a relatively great amount of close work, it might be desirable to provide relatively more of the reading areas or lines 16, whereas if the wearer is one who does little close work and requires the glasses mostly for distance vision, then it might be desirable to provide a lesser number of the lines 16, thus leaving a relatively greater area of the original surface 15 for distance vision.

I have shown in Figs. 5 and 6 comparative diagrammatic sections of a bifocal lens in which the formulas of the prescription are of a minus (—) character. These two sections are illustrative of the follnwing prescription:

$$\frac{distance - 3.50}{reading - 2.00}.$$

The lens of Fig. 5 has its outer face 18 curved to a formula of +1.25, and its inner face 19 curved to a formula of —4.75, thus providing the distance formula of —3.50 The rear face 20 of the reading section or disk is curved to the formula —3.25, thus providing the formula —2.00 for reading.

My improved lens of Fig. 6 has its outer and inner faces 22 and 23 formed respectively according to the formulas +1.25 and —4.75 respectively, as in the lens of Fig. 5, and to provide the necessary reading portion, the rear or inner face 23 of this lens has formed thereon a series of minute grooves or other depressed areas 24, corresponding to the formula —3.25 for providing the required amount of reading area of the formula —2.00. These grooves or portions 24 may be distributed as set forth above in connection with Figs. 3 and 4.

The various applied portions, such as the numerous minute ridges or plus areas, or the numerous minute grooves or depressed minus areas can be arranged other than in concentric formation. For example, they may be arranged in horizontal, vertical or diagonal formation, either parallel or not, or in the manner shown at 25 in Fig. 7, or in other ways.

While the invention, as described up to this point has disclosed a bifocal spectacle lens having, for example, a reading formula produced in minute spaced areas or portions of various forms upon a surface of the distance lens or blank, it should be clear that this procedure could be reversed and the blank formed to provide the reading formulas, and the distance formulas be produced by minute spaced areas or portions of appropriate form disposed on a face thereof.

An important result to be attained by my invention is that multifocal spectacle lenses may be produced thereby, in which several formulas for rendering clear vision of objects at progressively different distances from the user, may be incorporated. That is, instead of having a near vision formula, and say one distance vision formula formed as separate relatively large areas on different portions of the lens, as heretofore known, a number of different formulas for giving clear vision progressively from reading distance to far distance may be applied to a lens. These several formulas can be arranged in each of a plurality of concentric groups or grooves or ridges, each group including all of the different formulas, or they may be disposed as in Fig. 7, in the parallel arrangement before mentioned, or in various other ways which will readily suggest themselves.

To illustrate, there is shown diagrammatically in Fig. 8 a portion of a lens 27 of the same type as that of Figs. 5 and 6, but having formed upon its inner face 28 a series of areas or portions 29, 30, 31 and 32; increasing or decreasing for example in units of twenty-five diopters, as shown. Thus, the first of the two portions shown may be of plus (+) character, and the remaining portions of minus (—) character. These groups of portions in whatever form they are produced, may be repeated and distributed throughout said face 28, and each group may comprise the same series or any other number of formulas.

Or if desired, one portion of the lens may have thereon an area or areas representing one formula only, for instance, a reading formula, while the remaining part of the lens could be provided with groups of intermixed minute areas of varying formulas for more distant vision.

It should be clearly understood that the intermixed portions, sections or areas on my improved lens are extremely minute, preferably several thousand to the inch, so that the user looks simultaneously through a multiplicity of the minute different areas. They are, therefore, individually invisible, and permit the lens to be polished, so that the latter appears perfectly smooth, except upon critical inspection.

I claim as my invention:

1. A spectacle lens having a multiplicity of minute portions of different formulas distributed in close relation upon a face thereof, whereby the user looks simultaneously through a multiplicity of each of said formulas and obtains clear vision of objects at different distances.

2. A spectacle lens having a multiplicity of minute portions of different formulas arranged in intermixed order and in juxtaposition upon a face thereof, whereby the user looks simultaneously through a multiplicity of each of said formulas and obtains clear vision of objects at different distances.

3. A spectacle lens having one of its faces formed in accordance with a required formula, and having a multiplicity of closely arranged minute portions differing in formula from said face and which are distributed upon said face, whereby the user looks simultaneously through a multiplicity of each of said formulas and obtains clear vision of objects at different distances.

4. A spectacle lens having one of its faces formed in accordance with a required distance vision formula, and having a multiplicity of closely arranged portions differing in formula from said face which are distributed upon said distance face, whereby both far and other kinds of vision may be had simultaneously through any portion of said lens.

5. A multifocal spectacle lens having a multiplicity of closely arranged minute portions of several different formulas distributed in predetermined order over said lens, whereby the user looks simultaneously through a multiplicity of each of said formulas and obtains clear vision of objects at different distances.

6. A spectacle lens having a multiplicity of closely arranged, minute concentric areas of differing formulas disposed in predetermined order over the lens, whereby the user looks simultaneously through a multiplicity of each of said formulas and obtains clear vision of objects at different distances.

7. A spectacle lens having a multiplicity of closely arranged minute portions distributed over the lens, some of said portions having a formula differing from others of said portions, whereby the user looks simultaneously through a multiplicity of each of said formulas and obtains clear vision of objects at different distances.

8. A spectacle lens having a multiplicity of minute portions of different formulas, said portions being distributed over the lens with portions of one formula in close relation to portions differing in formula therefrom, whereby the user looks simultaneously through a multiplicity of each of said formulas and obtains clear vision of objects at different distances.

9. A spectacle lens having a plurality of groups of closely arranged minute portions, each of which groups comprises portions having different formulas, whereby the user looks simultaneously through a multiplicity of each of said formulas and obtains clear vision of objects at different distances.

10. A spectacle lens having minute portions of different formulas, which are distributed over the lens in a multiplicity of closely arranged groups, whereby the user looks simultaneously through a multiplicity of each of said formulas and obtains clear vision of objects at different distances.

HOWARD D. BEACH.